United States Patent
You et al.

(10) Patent No.: US 10,784,539 B2
(45) Date of Patent: Sep. 22, 2020

(54) ELECTRODE ASSEMBLY HAVING HIGH FLEXIBILITY AND BATTERY CELL INCLUDING THE SAME

(71) Applicant: LG Chem, Ltd., Seoul (KR)

(72) Inventors: Min Kyu You, Daejeon (KR); Sung Joong Kang, Daejeon (KR); Eun Kyung Mok, Daejeon (KR); In Sung Uhm, Daejeon (KR)

(73) Assignee: LG Chem, Ltd. (KR)

( * ) Notice: Subject to any disclaimer, the term of this patent is extended or adjusted under 35 U.S.C. 154(b) by 230 days.

(21) Appl. No.: 15/767,451

(22) PCT Filed: Mar. 31, 2017

(86) PCT No.: PCT/KR2017/003530
§ 371 (c)(1),
(2) Date: Apr. 11, 2018

(87) PCT Pub. No.: WO2017/171457
PCT Pub. Date: Oct. 5, 2017

(65) Prior Publication Data
US 2018/0301760 A1    Oct. 18, 2018

(30) Foreign Application Priority Data

Mar. 31, 2016  (KR) .................. 10-2016-0039145
Jun. 1, 2016   (KR) .................. 10-2016-0068123

(51) Int. Cl.
*H01M 10/0585*    (2010.01)
*H01M 2/16*       (2006.01)
(Continued)

(52) U.S. Cl.
CPC ......... *H01M 10/0585* (2013.01); *H01M 2/02* (2013.01); *H01M 2/16* (2013.01);
(Continued)

(58) Field of Classification Search
None
See application file for complete search history.

(56) References Cited

U.S. PATENT DOCUMENTS

| 2012/0058387 A1 | 3/2012 | Ahn |
| 2012/0321932 A1 | 12/2012 | Ise et al. |

(Continued)

FOREIGN PATENT DOCUMENTS

| EP | 3024053 A1 | 5/2016 |
| JP | 2013051130 A | 3/2013 |

(Continued)

OTHER PUBLICATIONS

International Search Report for Application No. PCT/KR2017/003530 dated Jul. 10, 2017.
(Continued)

*Primary Examiner* — Jonathan Crepeau
(74) *Attorney, Agent, or Firm* — Lerner, David, Littenberg, Krumholz & Mentlik, LLP

(57) ABSTRACT

The present invention provides an electrode assembly, including two or more positive electrode plates and two or more negative electrode plates laminated with each of separators interposed therebetween, wherein both side end portions of the electrode assembly are bent together in the same direction by a curvature radius (R) satisfying the following Equation 1:

$$S[\{1/\ln(x/y)\} * t] = R \qquad 1$$

wherein t is an average thickness (mm) of the laminated electrode assembly, x is a horizontal length of the electrode assembly, and y is a vertical length of the electrode assembly, and S is a constant of 10 or more, and $\ln(x/y) \geq 1$.

14 Claims, 5 Drawing Sheets

(51) Int. Cl.
*H01M 2/02* (2006.01)
*H01M 2/26* (2006.01)
*H01M 10/04* (2006.01)
*H01M 10/0525* (2010.01)

(52) U.S. Cl.
CPC ............ *H01M 2/168* (2013.01); *H01M 2/26* (2013.01); *H01M 10/04* (2013.01); *H01M 10/0525* (2013.01); *H01M 2/021* (2013.01)

(56) References Cited

U.S. PATENT DOCUMENTS

| | | | |
|---|---|---|---|
| 2014/0093762 A1 | 4/2014 | Goh et al. | |
| 2014/0234679 A1 | 8/2014 | Kim et al. | |
| 2015/0236337 A1 | 8/2015 | Kim et al. | |
| 2016/0013459 A1 | 1/2016 | Suh et al. | |
| 2016/0079625 A1 | 3/2016 | Shon et al. | |
| 2016/0133987 A1 | 5/2016 | Choi et al. | |
| 2016/0268625 A1 | 9/2016 | Choi et al. | |

FOREIGN PATENT DOCUMENTS

| | | | |
|---|---|---|---|
| KR | 20090097731 A | 9/2009 | |
| KR | 20120022385 A | 3/2012 | |
| KR | 20140065053 A | 5/2014 | |
| KR | 20150015355 A | 2/2015 | |
| KR | 20150050319 A | 5/2015 | |
| KR | 20150100017 A | 9/2015 | |
| KR | 20150128063 A | 11/2015 | |
| KR | 101587858 B1 | 1/2016 | |
| KR | 20160012368 A | 2/2016 | |
| KR | 20160031829 A | 3/2016 | |

OTHER PUBLICATIONS

Supplementary European Search Report for EP17775881 dated Sep. 20, 2018.

[Figure 1]
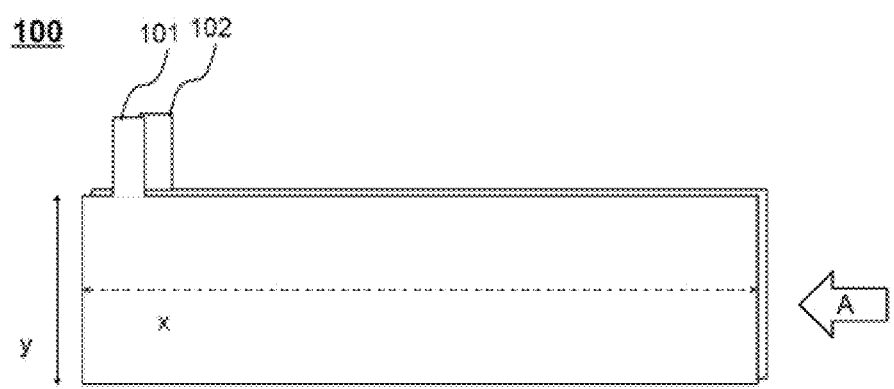

[Figure 2]
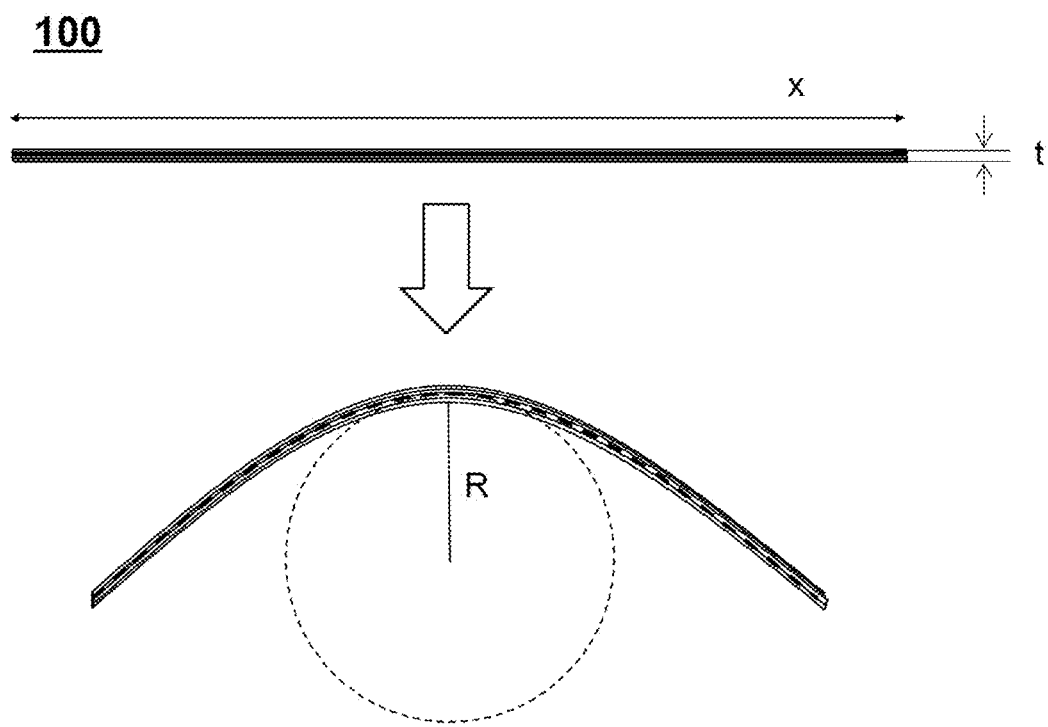

[Figure 3]
200
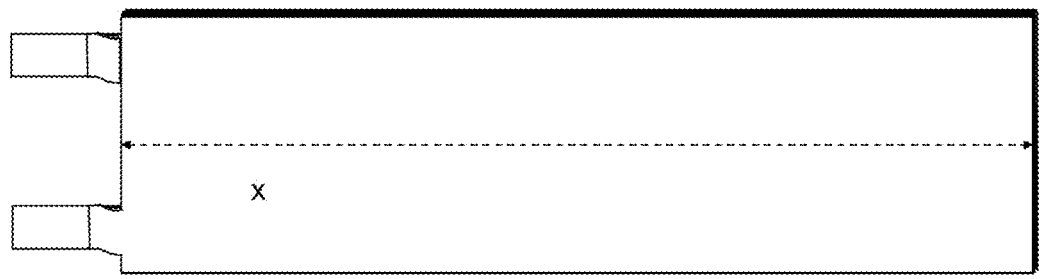
[Figure 4]
300
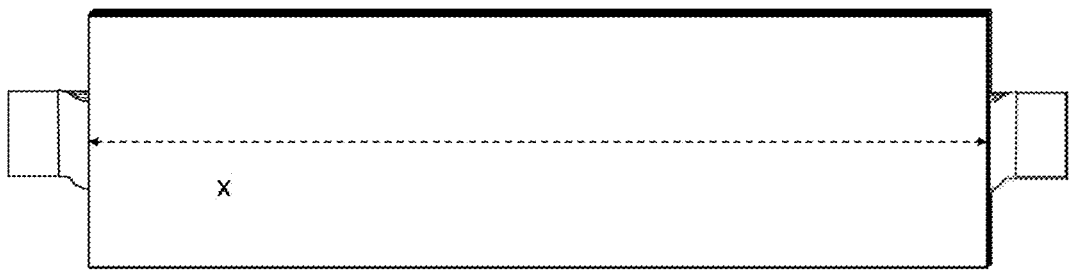

[Figure 5]
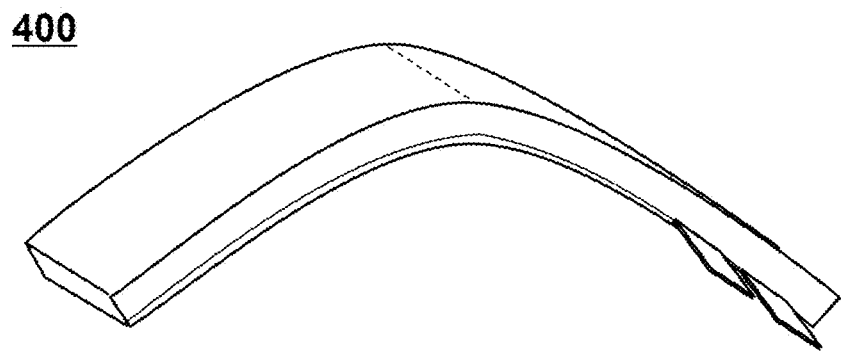
[Figure 6]
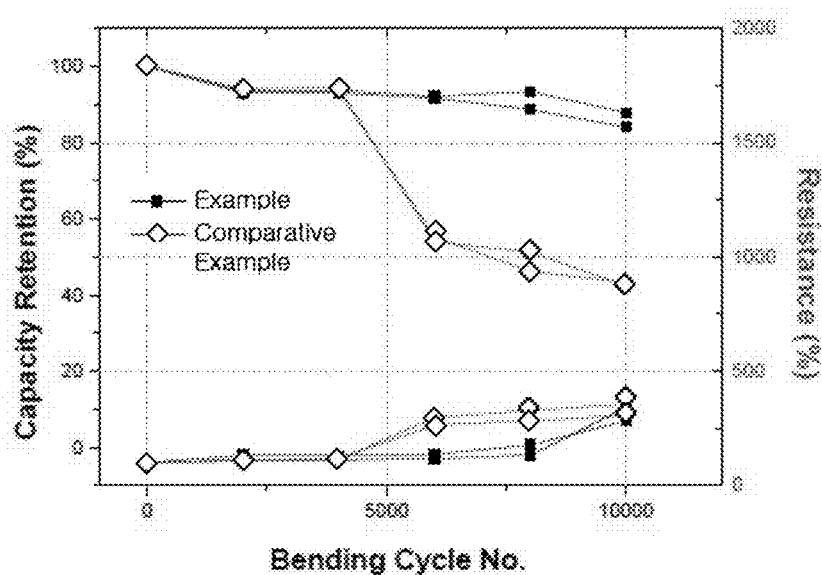
[Figure 7]
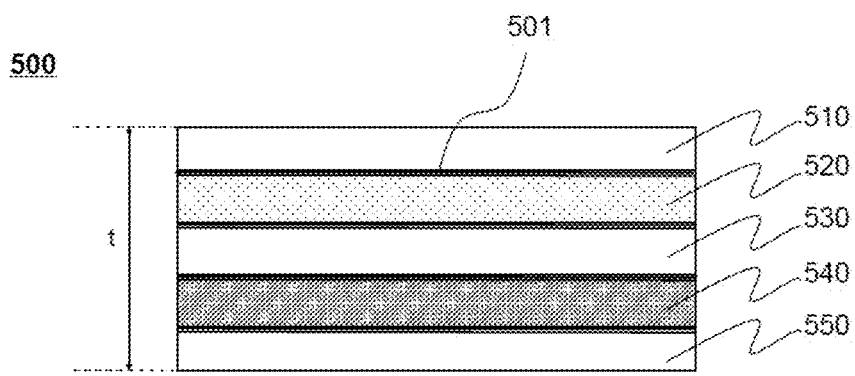

[Figure 8]
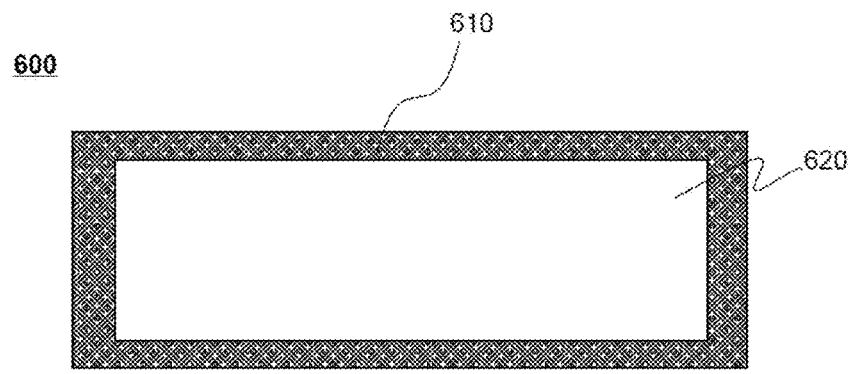
[Figure 9]
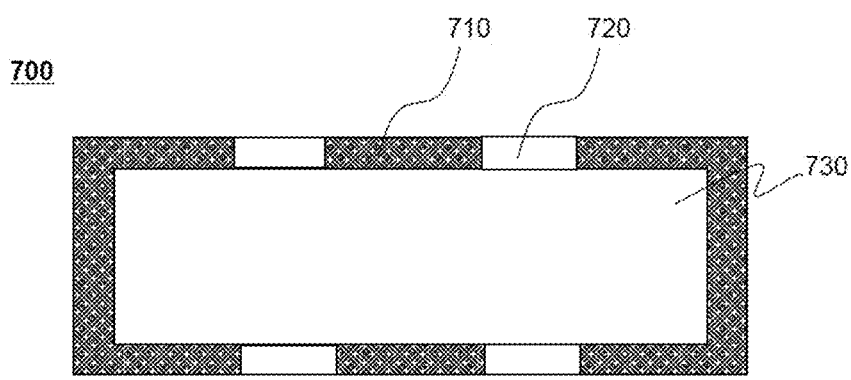
[Figure 10]
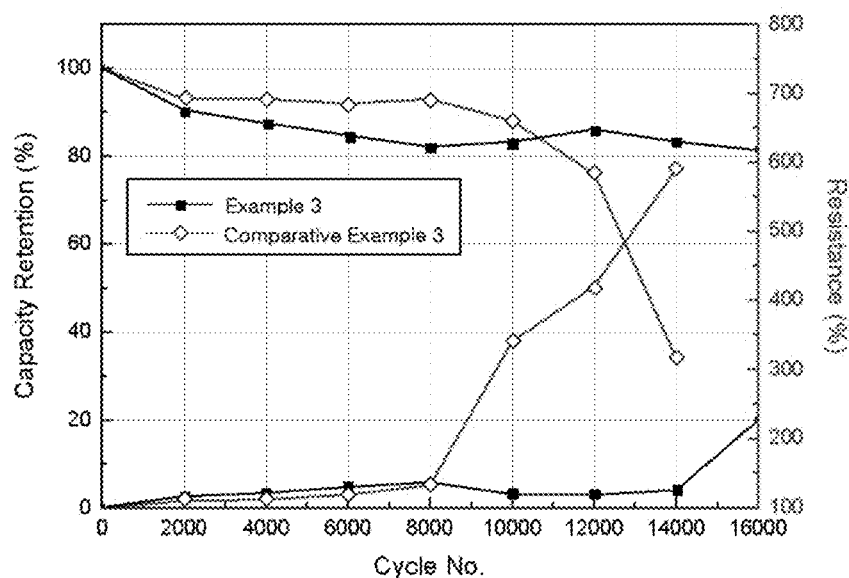

ELECTRODE ASSEMBLY HAVING HIGH FLEXIBILITY AND BATTERY CELL INCLUDING THE SAME

CROSS-REFERENCE TO RELATED APPLICATIONS

This application is a national phase entry under 35 U.S.C. § 371 of International Application No. PCT/KR2017/003530 filed on Mar. 31, 2017, published in Korean, which claims priority from Korean Patent Application No. 10-2016-0039145 filed on Mar. 31, 2016, and Korean Patent Application No. 10-2016-0068123 filed on Jun. 1, 2016, the entire contents of which are incorporated herein by reference.

TECHNICAL FIELD

The present invention relates to an electrode assembly having high flexibility, and more particularly, to an electrode assembly having a longer horizontal length than a vertical length, thereby having a bent shape, and a battery cell including the same.

BACKGROUND

As IT (information technology) has been stunningly developed, the spread of various portable information communication equipment is made, which leads to the development into ubiquitous society allowing high quality information service regardless of time and place in the $21^{st}$ century.

In the basis of the development into this ubiquitous society, a lithium secondary battery takes an important place. Specifically, a chargeable and dischargeable lithium secondary battery is widely used as an energy source of a wireless mobile device, and also as an energy source of electric cars, hybrid electric cars and the like which has been suggested as measures to resolve air pollution and the like of existing gasoline vehicles, diesel vehicles and the like using fossil fuels.

As described above, as devices to which the lithium secondary battery is applied are diversified, the lithium secondary battery is also diversified so that output and capacity appropriate for the applied device may be provided. In addition, the lithium secondary battery is strongly required to be smaller, lighter and thinner.

The lithium secondary battery may be classified into a cylindrical battery cell, an angular shape battery cell, a pouch shape battery cell and the like according to its shape, and these battery cells have a structure in which an electrode assembly including an electrode and a separator is mounted on a battery case together with an electrolyte solution.

Meanwhile, the design of the device may not be formed of only a rectangular parallelepiped shape, and may have a bendable shape. For example, a smart phone may be subjected to side curve processing for improving grip feeling, and a flexible display may be curved or bent, and manufactured in various forms.

Since the device which is designed to have a curved portion or may be bent like this has a limitation in embedding a battery cell having a specific shape in the space inside the device, recently, the battery cell is required to have a flexible characteristic, so that it may be easily embedded in the devices of various designs.

Accordingly, there is currently a high need for an electrode assembly and a battery cell which may be flexibly applied to a device, corresponding to the device having various shapes.

Technical Problem

The object of the present invention is to solve the problems of the conventional art as described above, and the technical challenges which have been requested from the past.

Specifically, the present invention has been made in an effort to provide an electrode assembly having advantages of having naturally bent shape by having a relatively longer horizontal length than a vertical length, more precisely corresponding to more various shapes of the device with high flexibility, and maintaining the battery characteristics almost equal to those of a common electrode assembly even with repeated bending, and a battery cell including the same.

In addition, the present invention has been made in an effort to provide an electrode assembly having a naturally curved shape and preventing the problem that the positions of a positive electrode, a separator and a negative electrode are shifted or separated from each other, and a battery cell including the same.

Technical Solution

An exemplary embodiment of the present invention provides an electrode assembly, including two or more positive electrode plates and two or more negative electrode plates laminated with each of separators interposed therebetween, wherein both side end portions of the electrode assembly are bent together in the same direction by a curvature radius (R) satisfying the following Equation 1:

$$S[\{1/\ln(x/y)\}*t] = R \qquad 1$$

wherein t is an average thickness (mm) of the laminated electrode assembly, x is a horizontal length of the electrode assembly, and y is a vertical length of the electrode assembly, and S is a constant of 10 or more, and $\ln(x/y) \geq 1$.

S is an arbitrary constant determined in consideration of flexural stress of a positive electrode plate and a negative electrode plate, and elastic force of a separator.

That is, the electrode assembly according to the present invention has a relatively longer horizontal length than a vertical length, thereby having a flexible structure in which transverse both side end portions are bent in the same direction, and thus, may be applied to a device having a curved outer shape, or a device in which the outer shape is flat but the shape of the portion where a battery cell is mounted is curved.

Specifically, the constant may be 10 or more, preferably 10 to 15. More preferably, the constant may be 11 to 14. Within the limitation of the curvature radius obtained when the constant value is satisfied, the electrode assembly maintains the battery characteristics such as a capacity retention almost equal to those of a common electrode assembly, while being not broken even after repeated bending.

The curvature radius (R) of the above equation is a curved surface radius when the electrode assembly is bent to the maximum at a certain point, and inversely proportional to the curvature. Therefore, as the curvature radius (R) is larger, the electrode assembly is bent to have a gentle curve, and as the curvature radius (R) is smaller, the electrode assembly is bent to have a sharp curve.

Accordingly, the curvature radius (R) is not particularly limited as long as the electrode assembly is not excessively bent so that the electrode is not broken with the stress in a central portion having a maximum curvature, and maintains a desired degree of a curved shape, but specifically, may be 5 mm to 40 mm, preferably 5 mm to 20 mm.

Particularly, when the curvature radius (R) is less than 5 mm, the electrode assembly is bent much, so that the electrode may be broken by stress formed by the laminated electrode plates and stress produced from bending, which is thus not preferable.

This curvature radius (R) is determined by an average thickness (t), and a ratio of a horizontal length (x) and a vertical length (y) of the electrode assembly.

Herein, the average thickness (t) of the electrode assembly refers to an average thickness at each point, as a length in a laminated direction of the positive electrode plate and the negative electrode plate with the separator interposed therebetween. As the average thickness (t) is larger, the capacity is increased but the curvature is decreased, and thus, various configurations may be formed, considering the stress of the positive electrode plate and the negative electrode plate, the desired capacity and the curvature.

For example, when using a metal membrane as a current collector included in the positive electrode plate and the negative electrode plate, bending stress is relatively high, and thus, each electrode plate may have a thickness of 200 µm or less, and when using a material having relatively small bending stress such as metal non-woven fabric, mesh or foam as a current collector, each electrode plate may have a thickness of 400 µm or less.

These positive electrode plate and negative electrode plate are laminated with the separator interposed therebetween, thereby forming a stack type electrode assembly, and the electrode assembly may have a structure in which the positive electrode plate and the negative electrode plate are laminated a limited number of times so that flexibility is secured. The lamination may be performed 5 or less times, and specifically, the thickness may be 2 mm or less, more specifically 0.2 to 1.8 mm, but not necessarily limited thereto.

More specifically, the electrode assembly according to the present invention may have a structure in which a first outside separator/a positive electrode/an inside separator/a negative electrode/a second outside separator may be laminated in this order, and the separators may be at least partially joined, thereby including the separator having a structure completely surrounding the positive electrode and the negative electrode as a triple layer. Therefore, even in the case that the electrode assembly is bent according to the deformed shape of the battery cell, the outside separators joined to the inside separator, the positive electrode and the negative electrode suppress movement of the electrodes, thereby preventing mismatch of the positive electrode and the negative electrode.

Accordingly, in the case of deforming the shape of a general electrode assembly according to the outer shape of the battery cell, the problems that the positive electrode, the separator and the negative electrode are bent with external force for deformation of the electrode assembly and stress for maintaining the deformed shape, thereby being out of the positions, or the positive electrode and the negative electrode are separated from the separator, thereby causing battery performance degradation, or an increased risk such as explosion by internal short circuit, may be prevented.

Meanwhile, since the electrode assembly according to the present invention has a structure having a longer horizontal length (x) than a vertical length (y), a battery cell having a predetermined thickness for securing capacity, and securing flexibility may be provided.

Specifically, since the horizontal length (x) is inversely proportional to the curvature radius (R), as the horizontal length is increased, the curvature radius (R) is smaller so that the electrode assembly is more bent, and as the horizontal length is decreased, a large curvature radius (R) is formed, so that the electrode assembly may have a relatively gentle curved shape.

The electrode assembly having the curvature radius as such may be naturally formed without additional external force on the basis of the horizontal length relative to the vertical length, and if required, may be derived to have a finer sized curvature radius by predetermined external force.

As such, the derivation of the electrode assembly according to the present invention to have a curved shape may be understood to be due to the dispersion of the stress in a curved state in a transverse direction having a relatively long length.

According to a specific example, the ratio of the vertical length (y) to the horizontal length (x) (y:x) may be 1:3 to 1:50, specifically 1:5 to 1:20, preferably 1:5 to 1:10.

In the case of being out of the above range, when the horizontal length is less than three times the vertical length, the desired flexibility is difficult to be obtained, and when the horizontal length is more than 50 times the vertical range, the stiffness of the electrode assembly may be unduly deteriorated, and the shape of the electrode assembly may be easily deformed even with small external force, and with this repeated change process, breakage of the electrode may be induced despite the outside separator surrounding the electrodes, and thus, such case is not preferable.

In addition, the electrode assembly may have the curvature radius increased or decreased depending on the horizontal length, and thus, the horizontal length (x) may be 5 mm to 500 mm, specifically 10 mm to 300 mm, more specifically 20 mm to 200 mm.

When the horizontal length (x) is less than 5 mm, flexibility due to an effect of dispersion of stress may not be expected, and thus, implement of the electrode assembly having the curvature radius (R) is difficult, and even in the case that the electrode assembly is forcibly deformed to have the curvature radius (R), breakage of the electrode may be caused by stress, which is, thus, not preferable.

However, when the horizontal length (x) is more than 500 mm, the curvature radius (R) is formed to be small so that the electrode assembly may be bent much, but on the contrary, the electrode assembly may be easily deformed even with low external force from the outside, and this process is repeated to induce electrode breakage, which is not preferable.

Such cases are, however, not determined only by the numerical value of the horizontal length, and the relationship with the vertical length should be also considered, as described above.

According to a specific example, in the electrode assembly having a structure in which a first outside separator/a positive electrode/an inside separator/a negative electrode/a second outside separator are laminated in this order, an adhesive layer including an adhesive material is coated on one side or both side outer surfaces of each separator, the first outside separator is joined to a first positive electrode surface of the positive electrode facing the first outside separator by the adhesive layer, a second positive electrode surface of the positive electrode which is an opposite surface of the first positive electrode surface is joined to the inside separator, the inside separator is joined to a first negative electrode surface of the negative electrode facing the inside separator, and a second negative electrode surface of the negative electrode which is an opposite surface of the first negative electrode surface is joined to the second outside separator.

Therefore, in the state that the first outside separator, the positive electrode, the inside separator, the negative electrode and the second outside separator are laminated in this order, they are joined to one surface of each other, and thus, movement of the positive electrode, the inside separator and the negative electrode is prevented, thereby preventing battery performance deterioration, and securing excellent safety.

According to another specific example, the separators include surplus portions extending outward beyond the size of the positive electrode and negative electrode on plane upper and lower portions and each of the both side portions, on the surplus portion, an adhesive layer including an adhesive material is coated, at least a portion of the surplus portion of the first outside separator is joined to the surplus portion of the first surface of the inside separator by the adhesive layer, and the surplus portion of the second surface of the inside separator which is an opposite surface of the first surface of the inside separator is joined to at least a portion of the surplus portion of the second outside separator.

If necessary, the entire surplus portion of the first outside separator is joined to the entire surplus portion of the first surface of the inside separator, and the entire surplus portion of the second surface of the inside separator is joined to the entire surplus portion of the second outside separator. Herein, since the surplus portions may be laminated in a vertical direction to the plane to match the same position, and the sizes of the separators may be the same or different from each other, when the adhesive layer including an adhesive material is coated only on the surplus portion of the separators as such, the positive electrode surface and the negative electrode surface facing the outside separators do not include an additional adhesive material and thus, the operating performance of the battery is relatively excellent.

According to another example, since the surplus portion of the first outside separator may be joined to the surplus portion of the first surface of the inside separator with unjoined portions being disposed at regular intervals, and the surplus portion of the second surface of the inside separator may be joined to the surplus portion of the second outside separator with unjoined portions being disposed at regular intervals, when the separators include unjoined portions, the electrode assembly may be more easily impregnated in the electrolyte solution, which is thus preferable.

The adhesive materials used for adhesion of the inside separator and the outside separators, and the inside and outside separators and the electrodes are not significantly limited. Therefore, since the materials used as a binder of the electrode may be used as the adhesive materials, the adhesive materials may be, for example, polyfluorovinylidene (PVdF), polyvinylalcohol (PVOH), carboxylmethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers, and most preferably polyfluorovinylidene (PVdF).

Meanwhile, the electrode assembly according to the present invention includes positive electrode tabs extended from the positive electrode plates, and a positive electrode lead and a negative electrode lead, each connecting the negative electrode tabs extended from the negative electrode plates, and the positions of the electrode leads are not particularly limited.

Specifically, according to a specific example, the electrode assembly may have a structure in which a positive electrode lead and a negative electrode lead protrude side by side in a parallel direction to the vertical length (y), or in an opposite direction to each other, or protrude side by side in a parallel direction to the horizontal length (x), or in an opposite direction to each other.

That is, the electrode assembly according to the present invention has high flexibility, but is not limited by the position of the electrode lead, and thus, may be mounted on more various devices in more various forms.

Another embodiment of the present invention provides a battery cell having a structure in which the electrode assembly is stored in a variable battery case together with an electrolyte solution, wherein both side end portions of the electrode assembly and the battery case in positions of facing each other are bent together in the same direction, so that a curved surface is formed on the outer surface of the battery cell.

The type of the battery cell is not particularly limited, however, as a specific example, may be a lithium secondary battery such as a lithium ion (Li-ion) rechargeable battery, a lithium polymer (Li-polymer) rechargeable battery, or a lithium ion polymer (Li-ion polymer) rechargeable battery having merits such as high energy density, discharge voltage and output stability.

In general, the lithium secondary battery includes a positive electrode, a negative electrode, a separator, and a lithium salt-containing non-aqueous electrolyte.

The positive electrode is manufactured by, for example, coating a mixture of a positive electrode active material, a conductive material, and a binder, and drying it, and if required, further adding a filler to the mixture.

The positive electrode current collector is generally manufactured to have a thickness of 3 to 500 μm. These positive electrodes current collector is not particularly limited as long as it does not cause a chemical change in the battery and have high conductivity, and for example, stainless steel, aluminum, nickel, titanium, fire carbon, or aluminum or stainless steel of which the surface is treated with carbon, nickel, titanium, silver and the like may be used. The positive electrode current collector may increase adhesion of the positive electrode active material by forming fine protrusions and depressions on the surfaces thereof, and may be formed in various forms such as a film, a sheet, foil, nets, a porous body, foam, a non-woven fabric body and the like.

The positive electrode active material may include layered compounds or compounds substituted with one or more transition metals such as lithium cobalt oxide ($LiCoO_2$) and lithium nickel oxide ($LiNiO_2$); lithium manganese oxides such as the chemical formula $Li_{1+x}Mn_{2-x}O_4$ (wherein x is 0-0.33), $LiMnO_3$, $LiMn_2O_3$, $LiMnO_2$ and the like; lithium copper oxide ($Li_2CuO_2$); vanadium oxides such as $LiV_3O_8$, $LiFe_3O_4$, $V_2O_5$ and $Cu_2V_2O_7$; Ni-site type lithium nickel oxides represented by the chemical formula $LiNi_{1-x}M_xO_2$ (wherein M=Co, Mn, Al, Cu, Fe, Mg, B or Ga, and x=0.01-0.3); lithium manganese composite oxides represented by the chemical formula $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline-earth metal ion in the chemical formula; disulfide compound; $Fe_2(MoO_4)_3$, and the like, but not limited thereto.

The conductive material is usually added at 1 to 30 wt %, based on the total weight of the mixture including the positive electrode active material. This conductive material is not particularly limited as long as it does not cause a chemical change in the battery and has conductivity, and for example, graphite such as natural graphite or artificial graphite; carbon black such as carbon black, acetylene black, ketjen black, channel black, furnace black, lamp black and summer black; conductive fiber such as carbon fiber or metal fiber; metal powder such as fluorocarbon, aluminum and nickel powder; conductive whisky such as zinc oxide and potassium titanate; conductive metal oxides such as titanium oxide; conductive materials such as a polyphenylene, and the like may be used.

The binder is a component assisting in binding the active material to the conductive material and the like, and binding to the current collector, and generally added at 1 to 30 wt %, based on the total weight of the mixture including the positive electrode active material.

However, since the electrode assembly according to the present invention has high flexibility, it is preferred that the content of the binder relative to the total weight of an electrode mixture is 3 wt % or more, so that a mixture layer is not separated in the shape deformation process.

As an example of this binder, polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like may be listed.

The filler is a component suppressing expansion of the positive electrode, and optionally used. It is not particularly limited as long as it does not case a chemical change in the battery and is a fibrous material, and for example, olefin-based polymers such as polyethylene and polypropylene; and fibrous materials such as glass fiber and carbon fiber may be used.

The negative electrode is manufactured by coating a negative electrode active material on the negative electrode current collector, and drying it, and if necessary, the components as described above may be optionally further included.

The negative electrode current collector is generally manufactured to have a thickness of 3 to 500 μm. This negative electrode current collector is not particularly limited as long as they do not cause a chemical change in the battery and have conductivity, and for example, copper, stainless steel, aluminum, nickel, titanium, fire carbon, or copper or stainless steel of which the surface is treated with carbon, nickel, titanium, silver and the like may be used, an aluminum-cadmium alloy, and the like may be used. In addition, like the positive electrode current collector, binding force of the negative electrode active material may be enhanced by forming fine protrusions and depressions on the surfaces thereof, and various forms such as a film, a sheet, foil, nets, a porous body, foam, a non-woven fabric body and the like may be used.

As the negative electrode active material, for example, carbons such as hard carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb or Ge; Me': Al, B, P, Si, an element of Group 1, 2 or 3 of the periodic table, or halogen; $0 < x \leq 1$; $1 \leq y \leq 3$; $1 \leq z \leq 8$); a lithium metal; a lithium alloy; a silicon-based alloy; a tin-based alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$ and $Bi_2O_5$; conductive polymers such as polyacetylene; Li—Co—Ni-based materials, and the like may be used.

The separator is interposed between the positive electrode and the negative electrode, and an insulating thin membrane having high ion transmission and mechanical strength is used. The separator has a pore diameter of generally 0.01-10 μm, and a thickness of generally 5-300 μm. As this separator, for example, olefin-based polymers such as chemical resistant and hydrophobic polypropylene; a sheet or non-woven fabric prepared by glass fiber, polyethylene or the like. When a solid electrolyte such as a polymer is used as the electrolyte, the solid electrolyte may be also used as the separator.

The electrolyte solution may be a lithium salt-containing non-aqueous electrolyte solution, and is composed of the non-aqueous electrolyte solution and the lithium salt. As the non-aqueous electrolyte solution, a non-aqueous organic solvent, an organic solid electrolyte, an inorganic solid electrolyte and the like are used, but not limited thereto.

As the non-aqueous organic solvent, for example, aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy (franc), 2-methyl tetrahydrofuran, dimethylsulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate and the like may be used.

As the organic solid electrolyte, for example, polymers including a polyethylene derivative, a polyethylene oxide derivative, a polypropylene oxide derivative, a phosphate ester polymer, poly agitation lysine, polyester sulfide, polyvinyl alcohol, polyvinylidene fluoride, an ionic dissociating group and the like may be used.

As the inorganic solid electrolyte, for example, nitrides, halides and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$DeletedTextsand the like may be used.

The lithium salt is a material which is easily dissolved in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic lithium carbonate, 4-phenyl lithium borate, imide, and the like may be used.

In addition, to the non-aqueous electrolyte solution, for improving a charge and discharge characteristic, flame retardancy and the like, for example, pyridine, triethylphosphite, triethanolamine, cyclic ether, ethylene diamine, n-glyme, triamide hexaphosphate, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, aluminum trichloride, and the like may be added. If necessary, for imparting nonflammability, a halogen-containing solvent such as carbon tetrachloride and ethylene trifluoride may be further included, and for improving a storage characteristic at high temperature, carbon dioxide gas may be further included, and FEC (fluoro-ethylene carbonate), PRS (propene sultone) and the like may be further included.

According to a specific example, a lithium salt such as $LiPF_6$, $LiClO_4$, $LiBF_4$ and LiN $(SO_2CF_3)_2$ is added to a mixed solvent of a cyclic carbonate of EC or PC which is a high dielectric solvent and a linear carbonate of DEC, DMC or EMC which is a low viscosity solvent, thereby preparing the lithium salt-containing non-aqueous electrolyte.

DESCRIPTION OF THE DRAWINGS

FIG. 1 is a perspective view schematically illustrating the electrode assembly according to an exemplary embodiment of the present invention;

FIG. 2 is a side view schematically illustrating the electrode assembly of FIG. 1;

FIG. 3 is a perspective view schematically illustrating the electrode assembly according to another exemplary embodiment of the present invention;

FIG. 4 is a perspective view schematically illustrating the electrode assembly according to another exemplary embodiment of the present invention;

FIG. 5 is a schematic view of the battery cell according to an exemplary embodiment of the present invention;

FIG. 6 is a graph representing capacity retentions and resistance increase rates of Examples 1 and 2, and Comparative Examples 1 and 2;

FIG. 7 is a cross-sectional view of the electrode assembly of FIG. 1 taken along direction A;

FIG. 8 is a front perspective view schematically illustrating the electrode assembly according to another exemplary embodiment of the present invention;

FIG. 9 is a front perspective view schematically illustrating the electrode assembly according to another exemplary embodiment of the present invention;

FIG. 10 is a graph representing capacity retentions and resistance increase rates of Example 3 and Comparative Example 3.

DETAILED DESCRIPTION OF THE EMBODIMENTS

Hereinafter, the present invention will be described referring to the drawings according to an exemplary embodiment of the present invention, however, the description is for more easy understanding of the present invention, and the scope of the present invention is not limited thereto.

FIG. 1 and FIG. 2 illustrate a perspective view and a side view schematically representing the electrode assembly according to an exemplary embodiment of the present invention.

Referring to FIG. 1, an electrode assembly 100 has a laminated structure with a separator being interposed between a positive electrode plate and a negative electrode plate, in which a positive electrode lead 101 and a negative electrode lead 102 protrude side by side in a parallel direction to a vertical length (y).

The electrode assembly 100 also has a horizontal length (x) equal to or more than approximately three times the vertical length (y).

Referring to FIG. 2 together with FIG. 1, even in the case that both side end portions of the electrode assembly 100 in a transverse direction are identically bent, stress is dispersed in the relatively long transverse direction. Therefore, the electrode assembly 100 may secure high flexibility, and if required, the curvature radius (R) may be adjusted by applying external force.

In the present invention, the curvature radius (R) is based on an approximate average position indicated by a thick dashed line to the thickness of the electrode assembly 100 on a vertical section, as shown in FIG. 2. The curvature radius (R) in the thick dashed line corresponds to a radius of a virtual circle drawn by extending a most curved surface in the electrode assembly 100.

As the curvature radius (R) is increased, the electrode assembly has a gentle curved line, and as the curvature radius (R) is decreased, the electrode assembly is bent to have a sharp curved line.

That is, electrode assembly 100 may be bent to have the curvature radius (R), and this curvature radius (R) satisfies the following Equation 1:

$$S[\{1/\ln(x/y)\}*t]=R \qquad 1$$

wherein t is an average thickness (mm) of the laminated electrode assembly, x is a horizontal length of the electrode assembly, and y is a vertical length of the electrode assembly, and S is a constant of 10 or more, and $\ln(x/y) \geq 1$.

Herein, S is an arbitrary constant determined in consideration of flexural stress of a positive electrode plate and a negative electrode plate, and elastic force of a separator.

Herein, the average thickness (t) of the electrode assembly 100 corresponds to the length in a laminated direction of the positive electrode plate and the negative electrode plate. When the type and the thickness of the positive electrode plate and the negative electrode plate are fixed, the curvature radius (R) of the present invention is determined by the ratio of a horizontal length (x) and a vertical length (y) of the electrode assembly 100, and in particular, as the horizontal length is longer, the electrode assembly 100 is easily bent due to the dispersion of stress, and thus, the electrode assembly may have a relatively higher bending degree, that is, a low curvature radius.

In addition, as the horizontal length is shorter, the dispersion degree of stress is lower, and thus, the electrode assembly 100 may have a high curvature radius so that it has a relatively gently curved shape.

The formulated curvature radius (R) is a preferred size not to cause an undesired defect such as short circuit or distortion in the bent electrode assembly 110, and the curvature radius (R) to maintain a more stably curved shape may be calculated, using the horizontal and vertical lengths of the electrode assembly 100, and Equation 1 provided in the present invention.

Therefore, the present invention provides the electrode assembly 100 having a preferred curvature radius by calculating the corresponding preferred curvature allowing a more stably curved shape to be maintained on the basis of Equation 1 above.

FIG. 3 and FIG. 4 schematically illustrate perspective views of the electrode assembly according to another exemplary embodiment of the present invention.

Compared with FIG. 1, FIG. 3 and FIG. 4 represent a differently positioned electrode lead. Specifically, in the electrode assembly 200 of FIG. 3, the positive electrode lead and the negative electrode lead protrude side by side in a parallel direction to the horizontal length (x), and in the electrode assembly 300 of FIG. 4, the positive electrode lead and the negative electrode lead protrude to be opposite directions to each other in a parallel direction to the horizontal length (x).

That is, in the electrode assembly according to the present invention, the positions of the positive electrode lead and the negative electrode lead may be freely adjusted, and thus, the electrode assembly may be mounted on more various devices in more various forms.

FIG. 5 schematically illustrates the battery cell according to an exemplary embodiment of the present invention.

Referring to FIG. 5, the battery cell 400 has a structure in which the electrode assembly 100 of FIG. 1 is stored in a variable battery case together with an electrolyte solution.

In addition, the battery cell 400 has a structure in which both side end portions of the electrode assembly 100 and the battery case in positions of facing each other are bent together in the same direction, so that a curved surface is formed on the outer surface of the battery cell.

FIG. 6 is a graph representing capacity retentions and resistance increase rates of Examples 1 and 2, and Comparative Examples 1 and 2.

Referring to FIG. 6, it is confirmed that Examples 1 and 2 satisfying the constant value S of 10 or more show better capacity retentions than those of Comparative Examples 1 and 2, while the resistance increase rates are not high.

FIG. 7 illustrates a cross-sectional view of the electrode assembly of FIG. 1 taken along direction A.

Referring to FIG. 7, the electrode assembly 500 includes one positive electrode 520, one negative electrode 540, and triple separators 510, 530 and 550, and thus, when the electrode assembly is bent, mismatch of the positive electrode 520 and the negative electrode 540, or separation from the inside separator 530 may be prevented. Specifically, the triple separators 510, 530 and 550 of the electrode assembly 500 is composed of a first outside separator 510, an inside separator 530, and a second outside separator 550, and the positive electrode 520 is disposed between the first outside separator 510 and the inside separator 530, and the negative electrode 540 is disposed between the inside separator 530 and the second outside separator 550.

Herein, as the average thickness (t) of the electrode assembly which is the length in the laminated direction of the electrode assembly 500 is larger, the capacity is increased, but the flexibility is decreased, and thus, the positive electrode 520 and the negative electrode 540 may be various configured considering stress to be applied, desired capacity and flexibility. For example, in the case of using a metal thin membrane as a current collector, the positive electrode 520 and the negative electrode 540 may be configured to have a thickness of 200 µm or less, respectively, and in the case of using the materials such as metal non-woven fabric, mesh or foam, the positive electrode 520 and the negative electrode 540 may be configured to have a thickness of 400 µm or less, respectively.

In addition, the adhesive layer 501 including an adhesive material may be coated on one side or both side outer surface of each of the triple separators 510, 530 and 550, in which the first outside separator 510 is joined to the first positive electrode surface of the positive electrode 520 facing the first outside separator 510, the inside separator 530 is jointed to the second positive electrode surface of the positive electrode 520 which is the opposite surface of the first positive electrode, the inside separator 530 is joined to the first negative electrode surface of the negative electrode 540 facing the inside separator 530, and the second negative electrode surface of the negative electrode 540 which is the opposite surface of the first negative electrode surface is joined to the second outside separator 550 of the second negative electrode.

Therefore, by having the triple separators 510, 530 and 550 joined to the positive electrode 520 and negative electrode 540, the electrode assembly 500 preventing performance deterioration and representing excellent stability may be manufactured.

FIG. 8 and FIG. 9 schematically illustrate a side view and a front view of the electrode assembly according to another exemplary embodiment of the present invention.

Referring to FIGS. 8 and 9, the triple separators have surplus portions extending outward beyond the size of the positive electrode and negative electrode 620 and 730 on plane upper and lower portions and each of the both side portions, and on these surplus portions 610 and 710, the adhesive layer including an adhesive material is coated. That is, at least a portion of the surplus portions 610 and 710 of the first outside separator are joined to the surplus portions 610 and 710 of the first surface of the inside separator by the adhesive layer, and the surplus portions 610 and 710 of the second surface of the inside separator which is an opposite surface of the first surface of the inside separator are joined to at least a portion of the surplus portions 610 and 710 of the second outside separator.

More specifically, the entire surplus portion 610 of the first outside separator of the triple separators is joined to the entire surplus portion 610 of the first surface of the inside separator, and the entire surplus portion 610 of the second surface of the inside separator is joined to the entire surplus portion 610 of the second outside separator. Herein, the surplus portions 610 may be laminated to be matched at the same position in a vertical direction on the plane, and the size of the separators may be the same or different.

According to another exemplary embodiment, the surplus portion 710 of the first outside separator is joined to the surplus portion 710 of the first surface of the inside separator with unjoined portions 720 being disposed at regular intervals, and the surplus portion 710 of the second surface of the inside separator is joined to the surplus portion 710 of the second outside separator including unjoined portions 720 formed at the positions corresponding to the unjoined portions 720 of the first outside separator and the inside separator.

Therefore, the present invention provides the electrode assembly 600 and 700 securing appropriate stability and having improved performance by excellent lithium mobility.

Therefore, in a device having a curved outer shape, or a device in which the shape of the portion where the battery is mounted is curved, a close contact structure is formed when mounting the battery cell having a curved surface formed in one axial direction, and thus, unnecessary space waste may be minimized, thereby allowing development of the device which is efficient and has various designs according to consumer tastes.

The present invention will be described in more detail in the following experimental examples, but is not limited thereto.

Example 1

A pouch type battery cell was manufactured by manufacturing an electrode assembly having a structure of a positive electrode, a negative electrode and a separator interposed therebetween so that the ratio of the horizontal length (x) and the vertical length (y) was 2.72, and the thickness thereof was 1.24 mm, storing the electrode assembly in a pouch type battery case together with an electrolyte solution, and sealing the pouch type case.

Example 2

A battery cell was manufactured in the same manner as in Example 1, except for manufacturing the electrode assembly to have a thickness of 1.35 mm.

Example 3

A battery cell was manufactured in the same manner as in Example 1, except for laminating a first outside separator/a positive electrode/an inside separator/a negative electrode/a second outside separator in this order, manufacturing an electrode assembly to have a thickness of 1.28 mm, and joining each surface of the separators and the electrodes facing each other.

Comparative Example 1

A battery cell was manufactured in the same manner as in Example 1, except for manufacturing the electrode assembly to have a thickness of 2.46 mm.

Comparative Example 2

A battery cell was manufactured in the same manner as in Example 1, except for manufacturing the electrode assembly to have a thickness of 2.65 mm.

Comparative Example 3

A battery cell was manufactured in the same manner as in Example 1, except for manufacturing an electrode assembly in an order of a positive electrode/a separator/a negative electrode, and joining one surface of the positive electrode and the separator, and the other surface of the negative electrode and the s separator, respectively.

Experimental Example 1

The initial capacities of the battery cells according to Examples 1 to 3, and Comparative Examples 1 to 3 were measured, and the capacities after repeatedly bending each battery cell by the curvature radius obtained according to the constant values as shown in the following Table 1 were measured, thereby calculating the capacity retention.

TABLE 1

|  | R (curvature radius) | S (constant) |
| --- | --- | --- |
| Example 1 | 15 | 12.10 |
| Example 2 | 15 | 12.40 |
| Example 3 | 15 | 11.72 |
| Comparative Example 1 | 15 | 6.10 |
| Comparative Example 2 | 15 | 7.50 |
| Comparative Example 3 | 15 | 12.10 |

TABLE 2

|  | Capacity retention (%) after bending 2,000 times | Capacity retention (%) after bending 4,000 times | Capacity retention (%) after bending 6,000 times | Capacity retention (%) after bending 8,000 times | Capacity retention (%) after bending 10,000 times | Capacity retention (%) after bending 12,000 times | Capacity retention (%) after bending 14,000 times |
| --- | --- | --- | --- | --- | --- | --- | --- |
| Example 1 | 93% | 93% | 92% | 93% | 88% | 76% | 34% |
| Example 2 | 92% | 93% | 92% | 89% | 84% | — | — |
| Example 3 | 90% | 88% | 85% | 82% | 83% | 86% | 83% |
| Comparative Example 1 | 93% | 93% | 55% | 46% | 43% | — | — |
| Comparative Example 2 | 94% | 94% | 54% | 51% | 42% | — | — |
| Comparative Example 3 | 93% | 93% | 92% | 93% | 88% | 76% | 34% |

Experimental Example 2

The battery resistance values of the battery cells according to Examples 1 to 3, and Comparative Examples 1 to 3 were measured, and the resistance values after repeatedly bending each battery cell by the curvature radius obtained according to the constant values as shown in the following Table 1 were measured, thereby calculating the resistance increase rates as compared with the resistance values before bending.

TABLE 3

|  | Resistance increase rate (%) after bending 2,000 times | Resistance increase rate (%) after bending 4,000 times | Resistance increase rate (%) after bending 6,000 times | Resistance increase rate (%) after bending 8,000 times | Resistance increase rate (%) after bending 10,000 times | Resistance increase rate (%) after bending 12,000 times | Resistance increase rate (%) after bending 14,000 times |
| --- | --- | --- | --- | --- | --- | --- | --- |
| Example 1 | 109% | 111% | 118% | 132% | 340% | 420% | 590% |
| Example 2 | 131% | 130% | 136% | 176% | 283% | — | — |
| Example 3 | 116% | 120% | 130% | 136% | 119% | 118% | 125% |
| Comparative Example 1 | 110% | 114% | 296% | 328% | 353% | — | — |
| Comparative Example 2 | 109% | 116% | 263% | 282% | 305% | — | — |
| Comparative Example 3 | 109% | 111% | 118% | 132% | 340% | 420% | 590% |

As shown in the above Table 2, the battery cells according to Examples 1 and 2 maintained high capacity retentions as compared with the capacity before bending, even after repeated bending by the curvature radius satisfying Equation 1, while the capacity retentions of Comparative Examples 1 and 2 were rapidly decreased after bending 6,000 times. Thus, it is seen that the electrode assemblies of Examples 1 and 2 have high flexibility and excellent battery performance.

In addition, it is confirmed that the battery cell of Example 3 maintained the capacity retention without significantly changing it, as compared with the battery cell of Comparative Example 3, and in particular, maintained the excellent capacity retention even after bending 12,000 times at which the capacity retention of the battery cell of Comparative Example 3 is rapidly decreased.

As shown in the above Table 3, it is confirmed that the battery cells according to Examples 1 and 2 did not have high resistance increase rates and maintained similar resistance increase rates, however, the battery cells according to Comparative Examples 1 and 2 maintained high resistance increase rates after bending 6,000 times as compared with the Examples.

It is confirmed that the battery cell of Comparative Example 3 had a rapidly increased resistance increase rate after bending 8,000 times, while the resistance of the battery cell of Example 3 was not increased significantly after bending up to 14,000 times.

A person with ordinary knowledge in the art to which the present invention pertains may perform various applications and modification within the scope of the present invention, based on the above description.

INDUSTRIAL APPLICABILITY

As described above, the electrode assembly and the battery cell according to the present invention have a relatively longer horizontal length than a vertical length, thereby being bent by a predetermined curvature radius, and having no limitation in the position of the electrode lead, and thus, may be variously applied to a device having a curved outer shape, or a device in which the outer shape is flat but the shape of the portion where a battery cell is mounted is curved.

The invention claimed is:

1. An electrode assembly comprising two or more positive electrode plates and two or more negative electrode plates laminated with separators interposed therebetween, wherein two opposite side end portions of the electrode assembly are bent together about a bending axis by a curvature radius (R) satisfying the following Equation 1:

$$S[\{1/\ln(x/y)\}*t]=R \qquad 1$$

wherein t is an average thickness (mm) of the laminated electrode assembly, x is a horizontal length of the electrode assembly, and y is a vertical length of the electrode assembly that is parallel to the bending axis, and S is a constant of 10 or more, and $\ln(x/y) \geq 1$.

2. The electrode assembly of claim 1, wherein the curvature radius (R) is 5 mm to 40 mm.

3. The electrode assembly of claim 1, wherein the horizontal length (x) is 5 mm to 500 mm.

4. The electrode assembly of claim 1, wherein a positive electrode lead and a negative electrode lead protrude side by side in a parallel direction to the vertical length (y), or in an opposite direction to each other, or protrude side by side in a parallel direction to the horizontal length (x), or in an opposite direction to each other.

5. The electrode assembly of claim 1, wherein the laminated electrode assembly has the average thickness (t) of 0.2 mm to 1.8 mm.

6. The electrode assembly of claim 1, wherein the constant S is 10 to 15.

7. The electrode assembly of claim 1, wherein the separators include inside separators, a first outside separator, and a second outside separator, and the positive electrodes, the negative electrodes and the inside separators interposed therebetween are sequentially laminated alternately between the first outside separator and the second outside separator, and a portion of or entire surface of each of the inside separators is mutually joined to at least one of the positive electrode, the negative electrode, the first outside separator, and the second outside separator.

8. The electrode assembly of claim 7, wherein the electrodes and the separators are laminated in an order of the first outside separator and the second outside separator being disposed outside of the positive electrodes, the negative electrodes, and the inside separators,
- an adhesive layer including an adhesive material is coated on inner surfaces of the outer separators, the first outer separator is joined to a first positive electrode surface of a first outer one of the positive electrodes by the adhesive layer,
- a second positive electrode surface of the first one of the positive electrodes which is an opposite surface of the first positive electrode surface is joined to a first one of the inside separators, the first one of the inside separators is joined to a first negative electrode surface of a first one of the negative electrodes facing the first one of the inside separators, and a second negative electrode surface of the first one of the negative electrodes which is an opposite surface of the first negative electrode surface is joined to a second one of the inside separators.

9. The electrode assembly of claim 7, wherein an adhesive layer including an adhesive material is coated on surplus portions of the separators having a larger size than a size of the positive electrodes and the negative electrodes, at least a portion of the surplus portion of the first outside separator is joined to a surplus portion of a first surface of a first one of the inside separators by the adhesive layer, and
- the surplus portion of a second surface of the first one of the inside separators is joined to at least a portion of the surplus portion of the second one of the inside separators.

10. The electrode assembly of claim 9, wherein the surplus portion of the first outside separator is joined to the surplus portion of the first surface of the first one of the inside separators with unjoined portions being disposed at regular intervals, and the surplus portion of the second surface of the first one of the inside separators may be joined to the surplus portion of the second one of the inside separators with unjoined portions being disposed at regular intervals.

11. The electrode assembly of claim 9, wherein the surplus portion of the first outside separator is joined to the entire surplus portion of the first surface of the first one of the inside separators, and the surplus portion of the second surface of the first one of the inside separators is joined to the entire surplus portion of the second one of the inside separators.

12. The electrode assembly of claim 8, wherein the adhesive material is one or more selected from the group consisting of: polyfluorovinylidene (PVdF), polyvinylalcohol (PVOH), carboxylmethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, and fluorine rubber.

13. A battery cell having a structure in which the electrode assembly of claim 1 is stored in a variable battery case together with an electrolyte solution,
- wherein both side end portions of the electrode assembly and the battery case in positions of facing each other are bent together in the same direction, so that a curved surface is formed on an outer surface of the battery cell.

14. The electrode assembly of claim 9, wherein the adhesive material is one or more selected from the group consisting of: polyfluorovinylidene (PVdF), polyvinylalcohol (PVOH), carboxylmethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, and fluorine rubber.

* * * * *